United States Patent Office 3,501,444
Patented Mar. 17, 1970

3,501,444
AROMATIC AZOPOLYMERS CONTAINING AMIDE LINKAGES
Hartwig C. Bach, Durham, N.C., assignor to Monsanto Company, St. Louis, Mo., a corporation of Delaware
No Drawing. Continuation-in-part of application Ser. No. 530,356, Feb. 28, 1966. This application Dec. 23, 1968, Ser. No. 786,459
Int. Cl. C08g *20/20, 33/02*
U.S. Cl. 260—78                7 Claims

ABSTRACT OF THE DISCLOSURE

Thermally resistant fibers and films have been prepared from a novel class of high molecular weight wholly ordered, wholly aromatic azopolymers containing interlinear azo linkages.

---

This application is a continuation-in-part of copending application Ser. No. 530,356, filed on Feb. 28, 1966, now abandoned.

This invention relates to new compositions of matter, and more particularly, to new high molecular weight, wholly aromatic azopolymers prepared from amide-modified aromatic primary diamines.

Aromatic polymers containing azo linkages are well known in the prior art. Low molecular weight polymeric azo dyes, for example those of U.S. Patent 2,994,693 to Blake et al., have been prepared which contain azo benzene linkages in the polymer chain together with aliphatic linkages. Polyaryl polymers have also been obtained by decomposition of bis-diazonium salts and consist mainly of chains of aromatic rings with a random incorporation of some azo groups. This invention provides azo-polymers which are not restricted to those that are in combination with copolymeric components of a random distribution of azo groups in the chain but consist entirely of aromatic azo linkages.

Accordingly, it is an object of the present invention to provide new high molecular weight, wholly aromatic azopolymers containing amide linkages which are easily prepared by oxidative coupling polymerization of the corresponding amide modified aromatic primary diamines using as a catalyst a cupric ion complexed with a nitrogen base.

Another object is to provide new aromatic azopolymers containing amide linkages which have an ordered sequence of regularly recurring structural units throughout the polymeric chain and each unit having a symmetrical configuration.

Yet another object of the invention is to provide high molecular weight fiber, filament and film from wholly ordered aromatic azopolymers containing amide linkages and having a high degree of thermal resistance.

The polymers of the invention consist essentially of those having repeating units of the formula

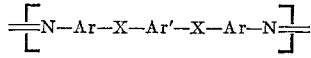

wherein Ar and Ar' are aromatic hydrocarbon radicals containing from 6 to about 15 carbon atoms, and X is a carbonamide linkage. Both Ar and Ar' may be the same or they may be different, but in order to preserve the overall symmetry of each unit, obviously both occurrences of Ar would have to be identical regardless of what composition Ar' is derived from. The amide linkages represented by X are oriented so that both N's are attached to either Ar or Ar'.

The aromatic hydrocarbon radical may be any single, multiple or fused ring system characterized by benzenoid unsaturation and containing from about 6 to 15 or more carbon atoms. Such aromatic radicals may be derived, for example, from benzene, biphenyl, naphthalene, diphenyl alkanes such as diphenyl methane, diphenyl ethane, diphenyl propane, and bridged diphenyls such as diphenyl sulfone, diphenyl ether, and the like and the corresponding compounds in which one or both of the aromatic rings contains one or more of the combination of lower alkyl, lower alkoxy, halogen, nitro, sulfonyl, lower carbalkoxy groups, the total number of carbon atoms in such substitutent groups attached to an aromatic ring being less than nine. When using the oxidative coupling polymerization method acid groups which are reactive with the catalyst used in polymerization or groups which are reactive in the sense of being oxidized by the catalyst are excluded. For example, acid groups such as —COOH, —SO₃H and oxidizable groups such as —SH, phenolic hydroxy

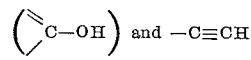

cannot be present as ring substituents. This restriction as to acid groups and oxidizable groups does not apply when the solution polycondensation method is used.

As examples of the aromatic azopolymers containing amide linkages of the invention, the following are typical and illustrative:

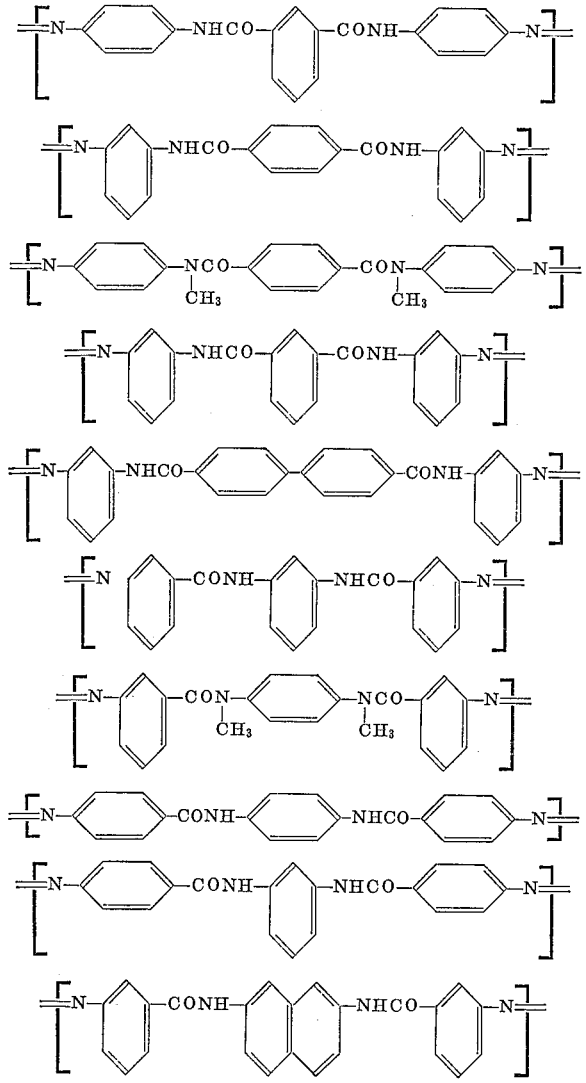

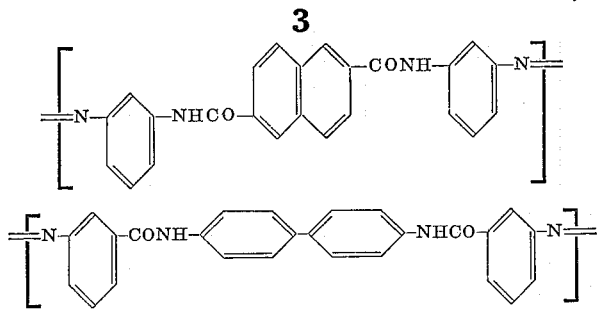

As stated previously, these polymers have a wholly ordered arrangement of symmetrical repeating units. That is, each unit has a point or plane or symmetry. The two aromatic hydrocarbons represented by Ar in each repeating unit are identical in structure and the two amide linkages represented by X are always positioned so as to be mirror images of each other. Thus, the overall effect is a symmetrical configuration which results in a wholly ordered polymer and which contributes substantially to the thermal resistance of the amide linkages containing aromatic azopolymers of the invention and to their fiber, filament and film forming properties.

The number of repeating units of the formulas above described is such that the polymers reflect inherent viscosities of at least 0.4 when measured in concentrated sulfuric acid as a 0.5 percent solution at 25° C. Such viscosities provide polymer chain length of sufficient dimension for use in fiber and film formation.

A preferred method of preparation of the polymers of the invention is by polymerization of amide modified primary diamines by an oxidative coupling process. This process generally consists of the oxidative solution polymerization of the corresponding amide modified primary diamines affected by catalyst system comprising a cupric ion complexed with a nitrogen base such as a tertiary amine, a cyclic amine or an N,N'-dialkyl mide.

The amide modified aromatic primary diamines used in the oxidative coupling polymerization to the polymers of the invention are those represented by the formula, $$NH_2-Ar-X-Ar'-X-Ar-NH_2$$

wherein Ar and Ar' and X have the significance previously given. The oxidative solution polymerization reaction may be illustrated as follows using a specific diamine for clarity.

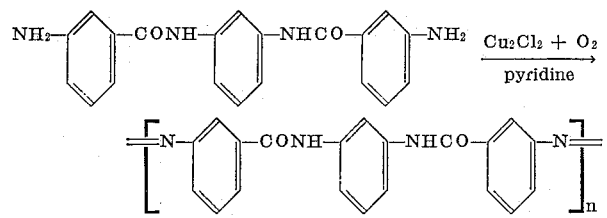

Another method suitable is solution polycondensation of the appropriate diamine and diacid chloride where at least one of the components contains an azo bond.

The invention is elucidated in greater detail by the following examples in which parts and percents are by weight unless otherwise indicated.

EXAMPLE I

Preparation of a polymer having the repeating unit

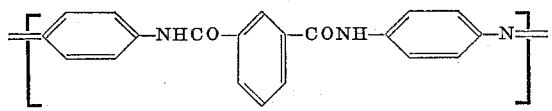

A 0.5 gram portion of cuprous chloride was oxidized with oxygen in a mixture of 20 ml. of pyridine and 30 ml. of dimethylacetamide (DMAc). Then 3.46 grams (0.01 mol) of N,N'-bis(para-aminophenyl)-isophthalamide were added. In 40 min. at 25° C. a total of 248 ml. of $O_2$ was absorbed by the mixture. The theoretical amount was 244 ml. $O_2$ at 25° C. A significant viscosity increase was observed during the polymerization. A film was cast from the dope. By coagulation in water, a dark brown polymer was isolated. The inherent viscosity of the polymer as measured in a solution of 0.5 g. of polymer in 100 ml. of concentrated sulfuric acid at 30° C. was 2.08.

The same polymer was also prepared by low temperature solution polymerization of 4,4'-diaminoazobenzene with isophthaloyl chloride. IR spectra of films of the two preparations were identical. Films of this composition remained flexible for 90 hrs. when heated at 300° C. in air.

A 16 percent solution of the polymer having an inherent viscosity of 1.04 in DMAc containing 5 percent of lithium chloride was dry jet-wet spun into a coagulation bath from which coagulated filaments were continuously removed, was given a 2.16× cascade stretch to provide "as-spun fibers." Another portion of the same polymer dope was spun in the same manner, given a 1.95× cascade stretch and then drawn 1.5× over a hot shoe at 350° C. Samples of as spun and hot drawn fibers were shown to exhibit the following properties:

|  | Tenacity (g./denier) | Elongation percent | Initial modulus (g./denier) |
| --- | --- | --- | --- |
| As spun | 2.5 | 19.6 | 58 |
| Hot-drawn | 4.4 | 9.0 | 93 |

Samples of the hot drawn fiber were heated to 350° C. Other samples of the hot drawn fiber were exposed for 80 hours in a Fade-Ometer (A.A.T.C.C. Standard Test Method 16-A-1964). Samples thus treated exhibited retention of properties as indicated:

|  | Tenacity | Elongation | Initial modulus |
| --- | --- | --- | --- |
| 350° heat | 1.5 | 6.6 | 39 |
| Fade-Ometer | 3.3 | 7.1 | 85 |

EXAMPLE II

Preparation of a polymer having the repeating unit

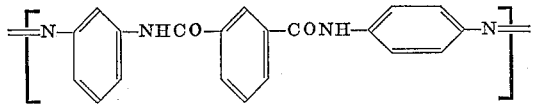

A 0.25 gram portion of cuprous chloride was oxidized with oxygen in a mixture of 5 ml. of pyridine and 10 ml. of dimethylacetamide. Then, 1.73 grams (0.005 mol) of N,N-bis(meta-aminophenyl)terephthalamide and 5 ml. of pyridine were added. In 4 hrs. and 45 min. at 55–60° C. a total of 122 ml. $O_2$ was absorbed at 25° C. by the mixture. The theoretical amount was 122 ml. $O_2$ at 25° C. The polymer was isolated by coagulation in water. The inherent viscosity of the polymer obtained from a solution of 0.5 gram of polymer in 100 ml. of concentrated sulfuric acid solvent was 0.4.

EXAMPLE III

Preparation of a polymer having the repeating unit

To a solution of 1.06 grams of 4,4,-diaminoazobenzene in 10 ml. of dimethylacetamide containing 5 percent lithium chloride there was added 1.02 grams of terephthaloyl chloride at a temperature of 0° C. After 5 min. the mixture was allowed to warm up to room temperature. During a 2 hr. period a total of 19 ml. of dimethylacetamide containing 5 percent lithium chloride was added. On coagulation in water, 1.65 grams of a dark brown material was obtained. The inherent viscosity of the polymer obtained from a solution of 0.5 gram of polymer in 100 ml. of concentrated sulfuric acid solvent at 30° C. was 1.0.

The azopolymers of this invention are useful in the preparation of fibers, filaments, films and other shaped articles for use in thermally resistant applications and other textile end uses. They may be used to prepare semi-conducting or photochromic materials and related products.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. A linear fiber and film forming polymer consisting essentially of an ordered sequence of repeating symmetrical units represented by the formula

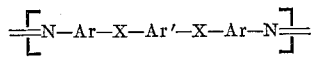

where Ar and Ar' are symmetrical divalent aromatic hydrocarbon radicals containing from 6 to 15 carbon atoms and X is an amide linkage having the formula

said polymer having an inherent viscosity of at least 0.4 measured as a 0.5 percent solution in concentrated sulfuric acid at 25° C.

2. The polymer of claim 1 wherein every occurrence of the divalent radicals Ar and Ar' is para-oriented.

3. The polymer of claim 1 represented by the formula

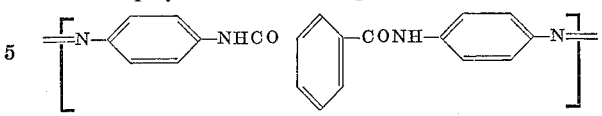

4. The polymer of claim 1 represented by the formula

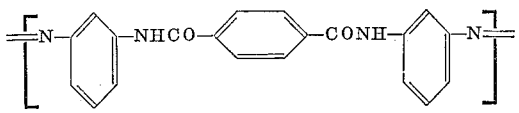

5. The polymer of claim 1 represented by the formula

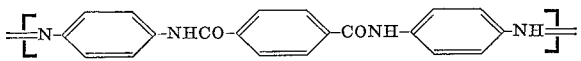

6. The polymer of claim 1 in fiber form.
7. The polymer of claim 3 in fiber form.

References Cited

UNITED STATES PATENTS 2,994,693   8/1961   Blake et al. _____ 260—144

WILLIAM H. SHORT, Primary Examiner

L. L. LEE, Assistant Examiner

U.S. Cl. X.R.
260—32.6, 47